No. 859,973. PATENTED JULY 16, 1907.
C. PFAU.
WATER CLOSET TANK VALVE.
APPLICATION FILED FEB. 23, 1905.

Witnesses:
Clarence L. Perdew
Ada Burnett

Inventor
Charles Pfau
By James A. Ramsey
Attorney.

THE NORRIS PETERS CO., WASHINGTON, D. C.

UNITED STATES PATENT OFFICE.

CHARLES PFAU, OF CINCINNATI, OHIO, ASSIGNOR TO THE PFAU MANUFACTURING COMPANY, OF CINCINNATI, OHIO, A CORPORATION OF OHIO.

WATER-CLOSET-TANK VALVE.

No. 859,973.  Specification of Letters Patent.  Patented July 16, 1907.

Application filed February 23, 1905. Serial No. 246,848.

*To all whom it may concern:*

Be it known that I, CHARLES PFAU, a citizen of the United States, residing at Cincinnati, in the county of Hamilton and State of Ohio, have invented certain new and useful Improvements in Water-Closet-Tank Valves, of which the following is a specification.

My invention relates to means for closing a closet flushing tank when the water in the tank has reached a desired level.

The object of my invention is to provide a simple and efficient device of this character.

My invention consists of a body provided with a valve seat, a gate hinged thereto having means for raising it and a trip, pivoted concentric with the gate, having a float attached adapted to be operated by the float to close the valve, by engagement with the gate thereof.

Figures 1, 2:
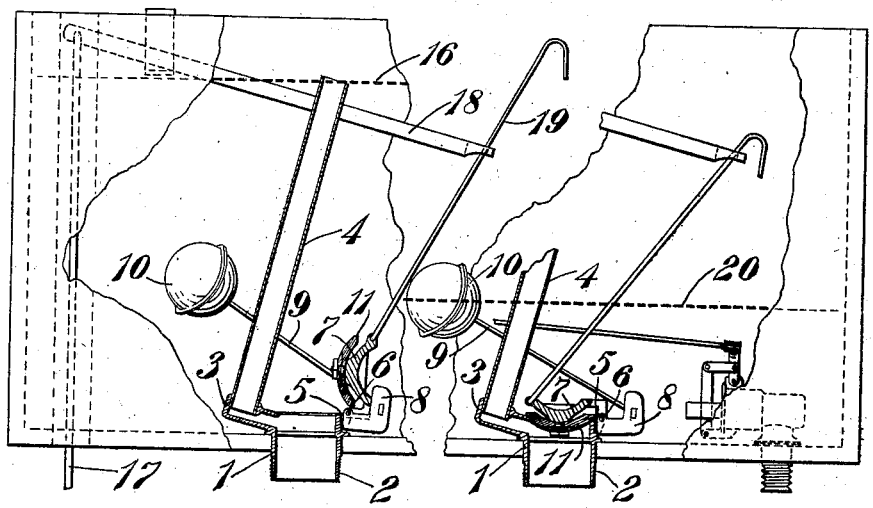
Figure 3:
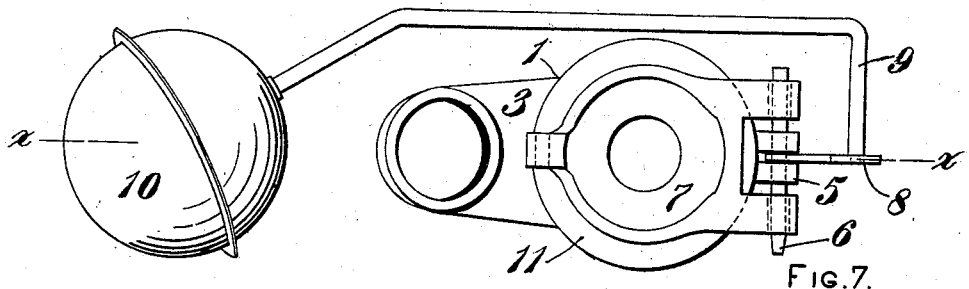
Figure 4:
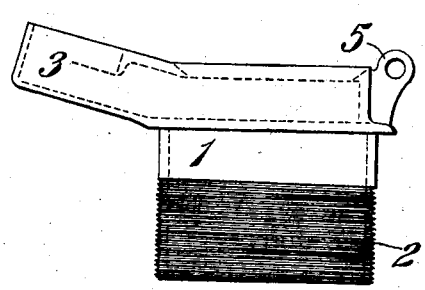
Figure 5:
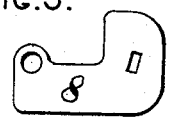
Figure 6:
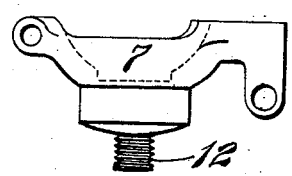
Figure 7:
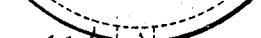
Figure 8:
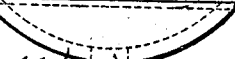
Figure 9:
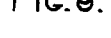

In the drawings: Figure 1 is a view of part of a water closet tank provided with my improved valve connection which is shown in section on a line corresponding to $x$—$x$ of Fig. 3, and with the gate in raised position, the water in the tank being represented by a heavy dotted line. Fig. 2 is a view of another part of a tank provided with the improved valve connection shown in a similar manner to that in Fig. 1, the valve having been closed by the action of the trip, and the water level in the tank being indicated by a heavy dotted line. Fig. 3 is a plan of the improved valve. Fig. 4 is an elevation of the body of the valve. Fig. 5 is a similar view of the trip. Fig. 6 is a similar view of the gate. Fig. 7 is a similar view of the rubber washer for the gate. Fig. 8 is a similar view of the metallic washer. Fig. 9 is a detail of the nut used to secure the rubber washer in place on the gate.

The construction of my improved water closet tank valve is as follows: The body portion 1 is provided with an extension threaded at 2 for connection to the flushing pipe of the closet and is provided with the open extension 3 to receive the overflow pipe 4. It is also provided with the ears 5 which form a bearing for the transverse pin 6 upon which is mounted the gate 7 and the trip 8. Preferably the gate 7 is loosely mounted on the pin, as shown, to allow it to seat easily. The trip may be rigidly mounted on the pin. Rigidly secured to the trip is the float lever 9, on the free end of which is suitably mounted the ball float 10. The rubber washer 11 is secured to the gate by passing the threaded portion of the gate through the hole 13 in the rubber washer, and securing it by means of a metallic washer 14 and the nut 15. Prefer- ably the over-flow 4 is inclined as shown so that the ball float 10 may swing behind it, making the entire apparatus more compact.

The operation of my improved water closet tank valve is as follows: Beginning with the water in the tank at its highest level, *i. e.* at the upper end of the over-flow pipe 4, as indicated by the heavy dotted line 16 in Fig. 1, the gate is raised by means of the rod 17, lever 18 and loop 19. The valve will then be in the position shown in Fig. 1, the gate resting against the trip and being supported by it. The water will rush out through the open valve and through the flushing pipe until it has reached the level indicated by the heavy dotted line 20 in Fig. 2. When the trip, being operated by the lowering float 10, is raised, the center of gravity of the gate is transferred from between the pivot pin 6 and the engaging points of the gate and trip. The gate will then fall and seat, and the valve will be closed. The tank will then be refilled by the action of other apparatus which does not form a part of this invention.

The advantages of my improvement are simplicity of construction with consequent durability and efficiency in operation. The apparatus is also more compact, whereby it is better suited for use in low down tanks where the size of the tank is necessarily limited.

I claim:

1. In a water closet tank valve, a body, ears on said body, a pin taking through said ears, a gate pivoted on said pin, a seat for said gate, a trip pivoted on the central part of said pin and having an angularly disposed portion free from contact or sliding engagement with other parts but adapted to engage and support said gate in raised position, a float lever rigidly attached to said trip, and a float attached to said float lever whereby said trip is moved about its pivot to displace the center of gravity of said gate and cause it to engage said seat, substantially as and for the purposes herein specified.

2. In a water closet tank valve, a body 1, ears 5 on said body, a pin 6 taking through said ears, a gate 7 having downwardly extending angular arms pivoted on said pin, a seat for said gate, a trip 8 pivoted on said pin centrally thereof and having a narrow upwardly extending portion adapted to engage and support said gate in raised position, an angular float lever 9 rigidly attached to said trip, a float 10 attached to said float lever and located on a line coincident with the longitudinal dimension of the trip whereby said trip is moved about its pivot to displace the center of gravity of said gate to cause it to engage said seat, substantially as and for the purposes set forth.

CHARLES PFAU.

Witnesses:
JAMES N. RAMSEY,
CLARENCE L. PERDEW.